July 26, 1966  J. E. BAADER  3,263,212

MOTOR DRIVEN FLASHER SYSTEM

Filed April 22, 1964  2 Sheets-Sheet 1

INVENTOR
JOSEPH E. BAADER

BY Semmes and Semmes

ATTORNEYS

July 26, 1966  J. E. BAADER  3,263,212

MOTOR DRIVEN FLASHER SYSTEM

Filed April 22, 1964  2 Sheets-Sheet 2

INVENTOR
JOSEPH E. BAADER

BY Semmes and Semmes

ATTORNEYS

United States Patent Office 3,263,212
Patented July 26, 1966

3,263,212
MOTOR DRIVEN FLASHER SYSTEM
Joseph E. Baader, 333 Holiday Drive, Springfield, Ohio
Filed Apr. 22, 1964, Ser. No. 361,773
1 Claim. (Cl. 340—81)

The present invention is directed to motor driven flasher units of the type which may be installed in school buses and other vehicles which require periodic flashing on and off of both turning and stopping lamps.

The present application is a continuation-in-part of applicant's co-pending application Serial No. 232,426, now abandoned entitled, Motor Driven Flasher System, filed October 23, 1962, and abandoned simultaneously with the filing of the present application.

The law in most states requires that the operator of a truck or motor coach stopping on the highway, signal by flashing, either simultaneously or alternately, both the amber turn signal lamps and the red rear stopping lamps.

Numerous previous inventors have attacked the problem of developing such a flasher for school bus, truck and like lighting systems. Such flashers have enabled the driver of the vehicle to use his conventional turn signal indicators upon stopping for loading or any other emergency to flash simultaneously or alternately the left and right turn signal lamps.

Conventionally bi-metallic relays have been employed. In Ringwald Patent No. 2,654,079 an elaborate bi-metallic relay is employed. A principal shortcoming of employing bi-metallic elements is that there occurs a slow-down in the opening and closing of the contacts, and thus the sequence of flashing of turn signals, as the load increases. Also, because of the complexity of parts, the bi-metallic relays aside from being subject to frequent breakdowns, are expensive to manufacture and maintain. It has been estimated that the installation charge for a conventional flasher employing a bi-metallic relay is $12.00.

Accordingly, the present invention is directed to an embodiment of a motor driven cam flasher which is durable, inexpensive to manufacture, and is readily connected to and removed from the turn signal circuits by a simple prong quick disconnect. Furthermore, since the relay is eliminated the sequence of flashing is not dependent upon the characteristics of a bi-metal; hence the sequence of flashing is constant and without reference to the length of time or load placed in the turn signal or stopping lamp circuits.

Accordingly, it is an object of invention to provide a motor driven flasher unit for use in vehicle lighting systems which is not subject to breakdown.

Another object of invention is to provide a motor driven flasher which is not subject to the load characteristics of the circuits in which it operates.

Yet, another object of invention is to provide a motor driven cam flasher unit which is readily attached and disconnected to a vehicle lighting system.

Figure 1:
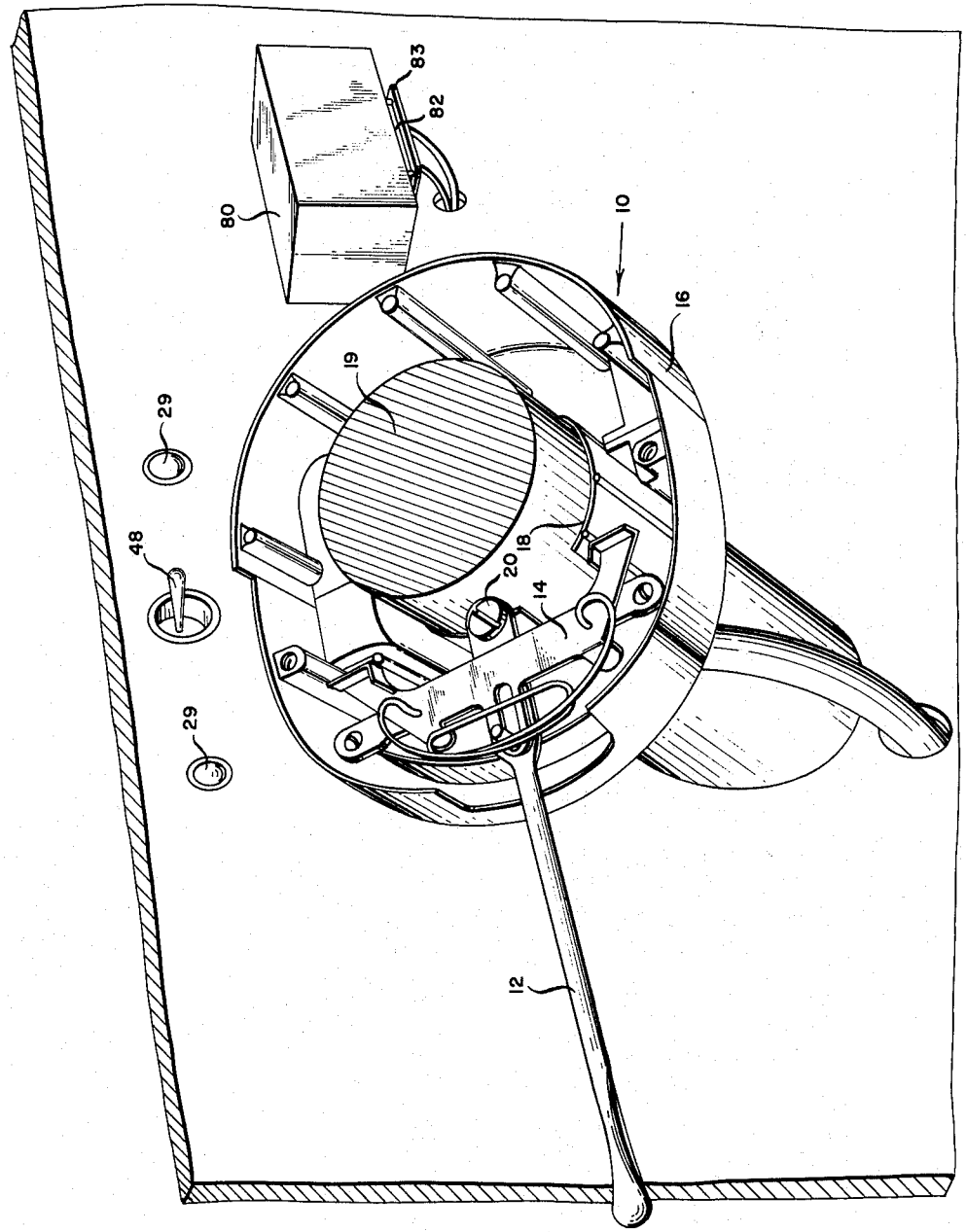
FIG. 1 is a front elevation showing the quick disconnect motor driven flasher engaging a dashboard plug adjacent the vehicle steering column and with the turn signal indicator panel removed.

In FIG. 1 turn signal indicator 10 is illustrated as having an inner collar 18 for mounting about an automobile steering shaft 19. Motor driven flasher unit generally designated as 80 is shown plugged into a socket 82 secured by bracket 83 to the automobile dash. An emergency flasher control switch 48 is shown also, with flasher warning or telltale pilot lamps 29.

Figure 3:
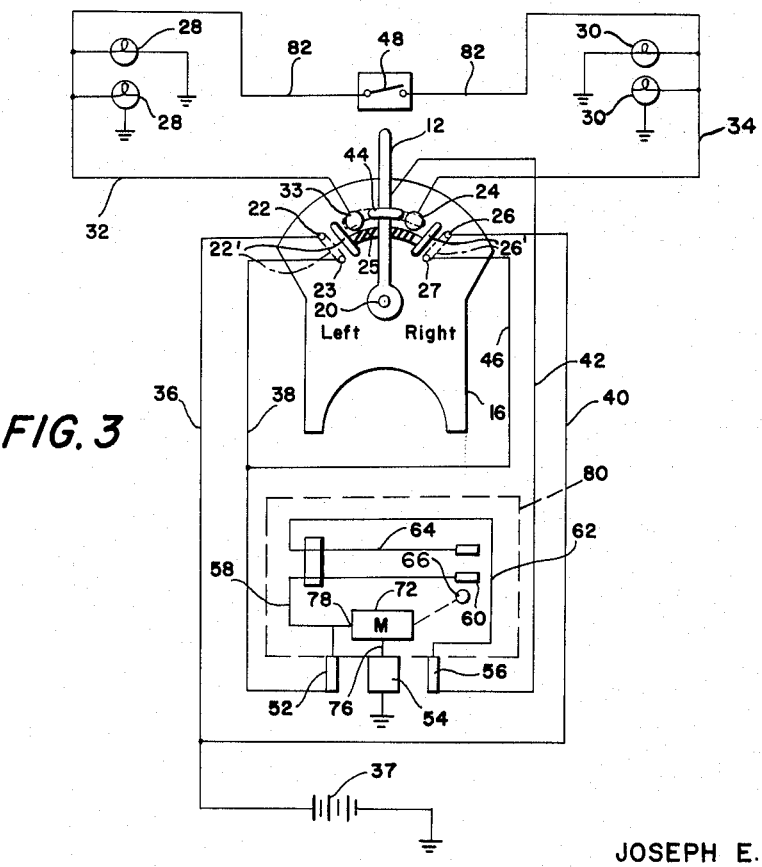
FIG. 3 is a schematic view of the circuitry employed, according to the present invention, with the selector switch arm 12 in vertical "off" position.

Turn signal indicator 10 comprises housing 16 with manual control arm 12 pivoted at point 20 and having a contacting arm 14. Arm 12 is integrated by insulation means 25 with left hand bridging contact 22' and right hand bridging contact 26'. As illustrated in FIG. 3, a pair of left turn contacts 22 and 23 are disposed at one side of the stationary left turn contact 33. The switch off position contact 44 is at the center of housing 16 and the stationary right hand contact 24 and the right hand contacts 26 and 27 are to the right of off position contact 44. As arm 12 is pivoted to engage stationary left turn contact 33, bridging contact 22' engages left hand contacts 22 and 23 as shown in dotted lines so as to close the flasher circuit. Similarly, when arm 12 is pivoted to the right to engage stationary right hand contact 24 bridging contact 26' engages right hand sliding contacts 26 and 27, also as shown in dotted lines.

The uppermost left turn contact 22 is connected by conductive means 36 to a source of electrical energy 37 such as a storage battery or the like. The lower and remaining contact 23 is connected by a conductive means 38 to flasher cam prong 52. Stationary left hand contact 33 which may be constructed of brass or the like is connected by a conductive means 32 to the individual left turn lamps 28 which are in turn grounded.

Switch off contact 44 is connected by conductive means 42 to the load side plug prong 56 of motor driven flasher 80. Right hand stationary contact 24 is connected to the right turn lamps 30 by means of conductive means 34. Similarly, right hand upper contact 26 is connected by a wire 40 to the source of electrical energy 37. Lower contact 27 is connected via conductive means 46 to the right hand conductive means 38, in turn connected to plug prong 52. Conductive means 82 interconnects the right and left turn lamps and may be closed by emergency flasher control switch 48 when it is desired to simultaneously flash both left and right hand turn lamps.

Figure 2:
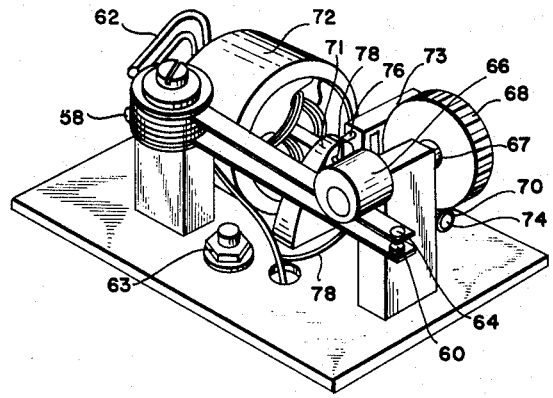
FIG. 2 is a perspective view of the flasher unit itself with a cam closing the pair of resilient contacts.

As illustrated in perspective in FIG. 2 and schematically in FIG. 3, motor driven flasher 80 includes also ground wire plug prong 54, connected at 76 to motor 72 stator element 73. Conductive means 58 leads from right and left hand contact connection 38 to leaf spring contact 60. Wire 62 leads from the switch off position contact prong 56 to leaf spring contact 64. Cam 66 is driven upon a shaft 67 connected to spur gear 68 in turn driven by worm 70 mounted upon roller shaft 74. Roller shaft 74 is positioned between opposed stator elements 71 and 73 and is driven by motor 72. Contact wire 78 leads from prong 52 to stator element 71.

As will be apparent, the right or left hand turn flashing signals are activated by the vehicle operator's moving manual switch 12 to the left or right so that the contacts engage either left hand bridging contact 22' or right hand bridging contact 26'. However, when it is desired to activate both right and left turn lamps, simultaneously, emergency flasher control switch 48 is also closed and the driving of the motor 72 with consequent rotation of cam 66 opens and closes simultaneousely the left and right hand turn circuits, thus, flashing simultaneously these lights. As illustrated in FIG. 1, pilot lamps 29 may be employed to indicate when the signal system is operating in this connection. As it is desired to replace or service the motor driven flasher unit 80, it may be removed from the circuits by simply unplugging from the bracket supported dashboard socket. There is no necessity for elaborate breakdown of the circuit system for rewiring.

Manifestly, numerous changes in substitution of parts may be imparted without departing from the spirit and scope of invention, as defined in the subjoined claim.

What is claimed is:

In an electrical system of the type employing a source of electrical energy, together with a first turn signal lamp circuit and a second turn signal lamp circuit connected with said source of energy, the combination of:

(A) a circuit breaker means interposed between said source and said first and said second circuits, said circuit breaker further including:
  (i) a mtor means,
  (ii) a single cam means operated by said motor means
  (iii) a pair of leaf spring contacts, each supported at one end of their ends and normally biased apart at their free ends, said cam means being engageable with one of said spring leaves so as to periodically close together said spring leaf contacts
  (iv) a quick disconnect plug means operably connected to said circiut breaker means;
(B) a manually operable selector switch interposed between each of said circuits and said circuit breaker and between said source and said motor, said switch including first and second contact means, connecting respectively said first lamp circiut or said second lamp circuit with said circuit breaker means to cause flashing of the connected circuit; and
(C) an emergency contact switch connected between said first and second lamp circuits, said emergency contact switch being closable to cause simultaneous flashing of both the first and second circuit upon closure of said selector switch, notwithstanding which contact means of said switch is closed.

References Cited by the Examiner

UNITED STATES PATENTS

| | | | |
|---|---|---|---|
| 2,654,079 | 9/1953 | Ringwald | 340—81 |
| 2,692,981 | 10/1954 | Hollins | 340—81 |
| 2,896,190 | 7/1959 | Gallaro et al. | 340—75 |

FOREIGN PATENTS

| | | |
|---|---|---|
| 676,826 | 8/1952 | Great Britain. |

NEIL C. READ, *Primary Examiner.*

A. J. KASPER, *Assistant Examiner.*